(12) United States Patent
Li et al.

(10) Patent No.: US 6,969,423 B2
(45) Date of Patent: Nov. 29, 2005

(54) LIGHTWEIGHT STRAIN HARDENING BRITTLE MATRIX COMPOSITES

(75) Inventors: Victor C. Li, Ann Arbor, MI (US); Shuxin Wang, Ann Arbor, MI (US)

(73) Assignee: The Regents of the University of Michigan, Ann Arbor, MI (US)

(*) Notice: Subject to any disclaimer, the term of this patent is extended or adjusted under 35 U.S.C. 154(b) by 59 days.

(21) Appl. No.: 10/674,772

(22) Filed: Sep. 30, 2003

(65) Prior Publication Data

US 2005/0066857 A1 Mar. 31, 2005

(51) Int. Cl.⁷ .................... C04B 38/08; C04B 16/06
(52) U.S. Cl. ............... 106/672; 106/676; 106/677; 106/724; 106/727; 106/802; 106/808; 106/814
(58) Field of Search .................. 106/672, 676, 106/677, 724, 727, 802, 808, 814

(56) References Cited

U.S. PATENT DOCUMENTS

| | | | | |
|---|---|---|---|---|
| 4,407,676 A | * | 10/1983 | Restrepo ................. | 521/54 |
| 5,002,620 A | * | 3/1991 | King ....................... | 156/153 |
| 5,030,282 A | * | 7/1991 | Matsuhashi et al. ...... | 106/692 |
| 5,891,374 A | * | 4/1999 | Shah et al. .............. | 264/108 |
| 6,203,609 B1 | * | 3/2001 | Castro et al. ............ | 106/705 |
| 6,572,697 B2 | * | 6/2003 | Gleeson et al. .......... | 106/705 |
| 6,723,162 B1 | * | 4/2004 | Cheyrezy et al. ........ | 106/644 |
| 2002/0117086 A1 | * | 8/2002 | Shi et al. ................. | 106/672 |
| 2003/0205172 A1 | * | 11/2003 | Gleeson et al. .......... | 106/679 |

FOREIGN PATENT DOCUMENTS

| | | | |
|---|---|---|---|
| JP | 60176976 A | * | 9/1985 |
| JP | 2004-131361 A | * | 4/2004 |
| JP | 2004/300001 A | * | 10/2004 |
| WO | WO99/58468 A1 | * | 11/1991 |

* cited by examiner

Primary Examiner—Anthony J. Green
(74) Attorney, Agent, or Firm—Brooks Kushman P.C.

(57) ABSTRACT

Fiber reinforced lightweight concrete composites employ less than 4% by volume of reinforcing fibers in conjunction with small particulate lightweight aggregates or voids, and cure to composites which exhibit high tensile strain and strain hardening behavior. The composites are useful for numerous structures in civil engineering.

19 Claims, 4 Drawing Sheets

LIGHTWEIGHT STRAIN HARDENING BRITTLE MATRIX COMPOSITES

BACKGROUND OF THE INVENTION

1. Field of the Invention

The present invention pertains to fiber reinforced, brittle matrix inorganic composites, particularly of a cementitious nature, which are lightweight, and which exhibit strain hardening behavior.

2. Background Art

Lightweight concrete has many cases, and is typically produced by incorporating lightweight aggregates such as pyroprocessed shales, clays, slates, expanded slags, expanded fly ash, and aggregates mined from porous volcanic sources into a hydraulically setting matrix. The air-dried unit weight is typically in the range of 1400 to 1900 kg/m$^3$. Yet further decreases in density can be achieved by foaming the mixes, wherein the encased air takes the form of small and spherically-shaped bubbles dispersed within the concrete matrix. P. E. Regan et al., "Lightweight Aggregate Foamed Concrete," STRUCTURAL ENGINEERING, Vol. 68, No. 9, 1990, pp. 167–173. Expanded polymer beads have also been used in such products.

Lightweight concrete affords the advantage of significant reduction in weight. In bridge and building design, for example, the reduced gravitational load and seismic internal mass allows reduced member sizes and foundation forces. However, use of lightweight concrete is limited due to its lack of ductility. While conventional concrete is hardly known for ductility, the cracking and brittle nature of concrete is even more pronounced in lightweight concrete, because the lightweight aggregate is usually weaker than the cement matrix, and provides little resistance to crack propagation. In such lightweight products, the fracture energy is typically only a fraction of that of normal concrete.

Significant improvement in fracture toughness can be achieved through incorporation of fiber reinforcement. However, conventional fiber reinforced concrete still exhibits quasi-brittle post-peak tension-softening behavior under tensile load, where the bearable load decreases with increases in crack opening. Tensile strain capacity thus remains low, about the same as normal concrete, i.e. about 0.01%. Considerable efforts have been expended into converting the quasi-brittle behavior of fiber reinforced concrete to ductile strain-hardening behavior resembling ductile metals. In most cases, the approach has been to increase the volume fraction of fibers as much as possible. As the volume fraction of fibers reaches the range of 4–10%, depending on the particular fiber, moderate strain hardening behavior may be achieved. For example, WO 99/58468 discloses a high performance concrete of normal density, wherein moderate strain hardening is achieved by incorporation of 4% by volume of polyvinyl alcohol fibers in a compact matrix which includes very hard, small diameter fillers. Nevertheless, the strain capacity is still less than 0.5%.

High fiber volumes create processing problems, however. Homogenous fiber dispersion become difficult due to the increasing viscosity of the mix as more and more fibers are dispersed. The high fiber surface area and the mechanical interaction between the fibers raises the viscosity such that processing also becomes difficult. Various processing techniques have been disclosed in attempts to solve such problems, such as the extrusion process of U.S. Pat. No. 5,891,374.

Lightweight concrete, as mentioned earlier, exhibits even higher brittleness and lower compressive strength than concrete of normal density. Adding large amounts of reinforcing fibers to concrete mix with lightweight aggregates is problematic, since the lightweight aggregate interferes with uniform dispersion of reinforcing fibers. Several attempts have been made to create lightweight concrete with improved tensile strain and strain hardening capacity. However, such attempts have not proven successful, due to inappropriate fiber type and weak interface bond strength. Moreover, the importance of size control of lightweight fillers has not been recognized by the art.

In U.S. Pat. No. 4,407,676, polyolefin film with fibrillated, hooked microfibrils is used to reinforce cement mortar containing gas bubbles or cellular plastic chunks. As cracks develop, bridging forces are provided predominantly by the mechanical interlock between the hooked microfibrils and the mortar matrix. The fibrillating process, however, provides various fibril dimensions. The ultimate composite tensile strength is limited as the small diameter fibers are ruptured under strain due to low fiber strength, and large diameter fibers are easily pulled from the matrix due to low bond strength and high Poisson ratio of polyolefin fibers. The resulting lightweight concrete does not exhibit tensile strain hardening, and compressive strength remains low, due to the use of gas bubbles or cellular plastic chunks.

U.S. Pat. No. 5,002,620 discloses multilayer concrete structures, where lightweight gas-bubble-containing, fiber reinforced concrete is used in conjunction with a dense, fiber reinforced concrete. Polypropylene fibers and carbon fibers are disclosed as being useful. However, carbon fibers are ill suited for use in cementitious composites when randomly distributed due to their brittleness and vulnerability to bending stress. Moreover, the structures disclosed are not only highly anisotropic, but also cannot, in tandem, achieve the strain hardening behavior desired of lightweight concrete.

U.S. Pat. No. 5,030,282 discloses the use of unidirectionally oriented continuous carbon fibers at high volume percent concentration to achieve light weight. However, such composites require unique processing, and are also highly anisotropic.

U.S. Pat. No. 6,203,609 discloses lightweight concrete containing polypropylene fibers and gas bubbles produced by reaction between aluminum metal powder and alkaline cementitious ingredients. However, strain hardening behavior is not achievable.

It would be desirable to provide lightweight concrete materials with higher physical properties than those presently available, in particular, high fracture toughness and strain hardening capacity, while maintaining light weight, ease of processing and application, and physical properties such as compressive strength.

SUMMARY OF THE INVENTION

It has now been surprisingly discovered that lightweight, fiber reinforced concrete composites can be prepared from a brittle matrix containing less than 4% of preferably matrix interactive fibers, and uniformly dispersed lightweight aggregates (or voids) having a mean size of 10 μm to 1000 μm. The composites may have a density as low as 800 kg/m$^3$ or lower, and generally exhibit tensile strain of 2 to 3% or more, with strain hardening characteristics of ductile materials.

DETAILED DESCRIPTION OF THE PREFERRED EMBODIMENT(S)

The compositions of the present invention consist minimally of a hydraulic cement or inorganic polymer, short, reinforcing, and preferably matrix-interacting fibers in an amount of less than 4 volume percent, and lightweight fillers or voids ranging in size from 10 $\mu$m to 1000 $\mu$m. These ingredients may be supplied separately, or in the form of one or more dry mix components. Water is added to these components to form a hydraulically settable mixture of the desired consistency. Customary additional ingredients such as rheological modifiers, thixotropes, plasticizers, superplasticizers, water reducing agents, setting retardants, setting accelerators, and the like may be added as well.

The hydraulic inorganic component comprises one or more conventional cements or inorganic polymers, and provides the brittle matrix of the composite. By "hydraulic cement" is meant a cement which sets, or hardens, in the presence of water, including but not limited to Portland cement, blended Portland cement, expansive cement, rapid setting and hardening cement, calcium aluminate cement, magnesium phosphate, and mixtures thereof. Pozzolanic admixtures such as fly ash and silica fume can be included in the mixtures. For economical reasons, hydraulic cements are preferred for use in the subject invention. However, inorganic polymers such as geopolymers based on silicoaluminates may also be used.

The reinforcing fibers used are present in an amount of 0.5 to less than 4 volume percent, preferably 1.0 to 3.0 volume percent, and most preferably 1.5 to 2.5 volume percent. The nature of the fibers must meet certain criteria. For example, the fibers must be of high strength and modulus, and must exhibit a high bond strength to the matrix. Fibers which do not meet such limitations may be added in addition to those which do meet the limitations, but are preferably absent. Fiber length is about 4 mm or greater, and generally limited by processing constraints to 30 mm or less. The average diameter of the fibers is from 10 to 100 $\mu$m, preferably 10 to 60 $\mu$m, more preferably 20 to 60 $\mu$m, and yet more preferably 30 to 60 $\mu$m.

In addition to the foregoing, the fibers should preferably exhibit a strength of at least 800 MPa; a modulus of elasticity from 10 to 300 GPa, more preferably 40 to 200 GPa; interfacial chemical bonding below 4.0 J/m$^2$ and more preferably below 2.5 J/m$^2$, and preferably, depending upon interface frictional stress, above 0.1 J/m$^2$ and more preferably above 0.3 J/m$^2$; interface frictional stress from 0.5 to 3.0 MPa and more preferably from 0.8 to 2.0 MPa; and an interface slip hardening coefficient below 3.0 and more preferably below 1.5. Interfacial properties can be characterized by single fiber pullout tests as disclosed in A. Katz et al., "A Special Technique for Determining the Bond Strength of Carbon Fibers in Cement Matrix by Pullout Test," JOURNAL OF MATERIALS SCIENCE LETTERS, 15, 1996, pp. 1821–1823, while remaining properties may be obtained from the fiber manufacturer or determined by standard test methods. By "matrix interactive" is meant the combined interaction with the matrix, e.g. the combination of interfacial chemical bonding and interface frictional stress. Fibers which meet the above limitations are matrix interactive.

Examples of suitable reinforcing fibers useful in the present invention include aromatic polyamide fibers ("aramid" fibers), high modulus polyethylene fibers (i.e. SPECTRA™ fibers), and polyvinyl alcohol fibers. This list is illustrative, and not limiting. The fibers preferably contain polar groups, and more preferably hydrophilic groups which provide a high degree of interaction with the brittle matrix ("matrix interactive"). Fibers which hydrolyze under basic conditions, such as polyester fibers, are not preferred. Examples of fibers which are not suitable include carbon fibers, conventional polypropylene fibers, cellulose fibers, low density polyethylene fibers, and steel fibers. Copolymer fibers are also useful, for example high modulus polyethylene fibers also containing residues of hydrophilic monomers such as acrylic acid, maleic anhydride, fumaric acid, 2-hydroxyethylacrylate, vinyl acetate, and the like. Such monomers, when polymerized with ethylene, are preferably used in small quantities to preserve the modulus of the fiber. A preferred fiber is K-II REC™, a polyvinylalcohol fiber available from Kuraray Co., Ltd., Osaka, Japan, having a nominal diameter of 39 $\mu$m, a mean length of 12 mm, a modulus of elasticity of 42.8 GPa, a frictional stress of 2.0 GPa, a chemical bond strength of 2.2 J/m$^2$, a slip hardening coefficient of 1.2, and a nominal strength of 1620 MPa.

The lightweight filler has a particle size of 10 $\mu$m to 1000 $\mu$m, preferably 10 to 400 $\mu$m, more preferably from 10 to 100 $\mu$m, and are present in an amount sufficient to achieve a target density, preferably in the range of 800 Kg/m$^3$ to about 2000 Kg/m$^3$, preferably 1000 Kg/m$^3$ to 1900 Kg/m$^3$, and most preferably 1000 kg/m$^3$ to 1400 Kg/m$^3$. The lightweight filler may be present in amounts of up to 40 volume percent, for example.

The lightweight aggregate may be those such as have previously been used to produce lightweight concrete, but in the range of particle sizes previously stated. The particle sizes are measured by the sieve analysis test as set forth in ASTM C 125.

The lightweight "aggregate" may also comprise gas bubbles, all or in part. The gas may be introduced during processing of the hydraulically settable mixture by physical means, i.e. frothing or aeration, or may be chemically induced, for example hydrogen gas by reaction of aluminum powder with the alkaline composition, or through the use of Si—H functional silanes which liberate hydrogen by reaction with water under these conditions. If gas bubbles are used as the sole lightweight aggregate, it is preferred that stabilizing substances be added to assist in preventing coalescence of adjoining bubbles, or that the volume percent be limited so as to provide a cured density of about 1400 Kg/m$^3$ or higher, preferably 1500 Kg/m$^3$ or higher. If significant coalescence to large voids occurs, strength properties of the composite, particularly strain hardening behavior, will be compromised. Gas bubbles are particularly useful when used in conjunction with other lightweight aggregates. In such formulations, the volume fraction of gas bubbles can be kept small so that coalescence will be minimal. For example, in a composite with a target density of 1300 Kg/m$^3$, enough gas or gas precursor may be added so as to result in a density of about 1600 Kg/m$^3$ or higher if used alone, and enough other lightweight filler added to lower the density to the target range.

Preferably, a substantial amount or all of the lightweight filler is composed of synthetic beads or microspheres which are either hollow or of low density. Preferred microspheres or "microballoons" are hollow ceramic or glass microspheres such as those available from the 3M Company under the tradename "Scotchlite™" Glass Bubbles, i.e. Scotchlite S38 with a density of 380 Kg/m$^3$, a size distribution between 10 and 80 $\mu$m, and a mean particle size of 40 $\mu$m; and Scotchlite S60, with a density of 600 Kg/m$^3$, a size distribution of 10 to 60 $\mu$m, and a mean particle size of 30 $\mu$m. Preferred ceramic microspheres include Extendospheres™, available from PQ Corporation, and Zeospheres™, available from 3M Corporation.

Polymer microballoons have also proven useful. Examples of polymer microballoons include micro-hollow-bubble MHK, having a density of 16.7 Kg/m$^3$, a size distribution of 40–120 $\mu$m, an average mean size of 80 $\mu$m, available from Heidelberger Bauchemie Co., Ltd., Leimen, Germany, and composed of polyvinylidene chloride/acrylonitrile copolymer. In selecting polymer microballoons, it is desirable to select those which interact with the brittle matrix through a content of polar groups, hydrophilic groups, or reactive groups, although non-interactive microballoons are useful as well. Microballoons of many types of polymers are commercially available.

Also useful are foamed particles, e.g. foamed polyolefin or foamed polystyrene, particularly in larger sizes, i.e. sizes about 100 $\mu$m.

Sufficient water is added to the hydraulic cement, fibers, and lightweight aggregate to achieve the desired consistency. The preferred amount of water is about 0.4 to 0.6 parts water to each one part cement, i.e. not including reinforcing fibers or lightweight aggregate. The order of mixing is not critical, and the components may be added one at a time in any order, all at the same time, or in the form of premixed assemblies containing only certain components.

A viscosity control agent is often necessary to prevent segregation, since the lightweight filler is much lighter than cement and any dense aggregate. Numerous viscosity control agents are commercially available, including modified celluloses such as hydroxypropylmethylcellulose available as "Methocel™ cellulose ethers from Dow Chemical Co., and polymeric thickeners such as polyvinyl alcohol polymers. The amount of viscosity control agent may be any amount which is effective, generally from 0.5 pph to 5 pph, preferably about 1 pph based on the weight of the cement component.

Water reducing agents which modify the working consistency following addition of water are also useful. One such reducing agent, or "superplasticizer," is a melamine formaldehyde condensate available from W.R. Grace & Co., Illinois, as Melment™ 300. The amount of water reducing agent will vary with the particular components of the mix as well as the amount of water used, but is generally in the range of 0.5 pph to 5 pph, preferably 1 pph to 5 pph based on the amount of cement.

The compositions of the present invention, when cured or "set" by addition of water, form high strength lightweight brittle matrix composites with strain hardening behavior. By proper selection of fibers and lightweight aggregate, densities in the range of 800 kg/m$^3$ or below, to 2000 kg/m$^3$ can be achieved at useful combinations of other physical properties. Composites with densities in the range of 900 to 1600 kg/m$^3$ can all exhibit tensile strain capacity greater than 3%, which is exceptionally surprising, and yet the bulk of these compositions can also exhibit tensile and compressive strength comparable or superior to fully dense fiber reinforced cement.

Figure 6:
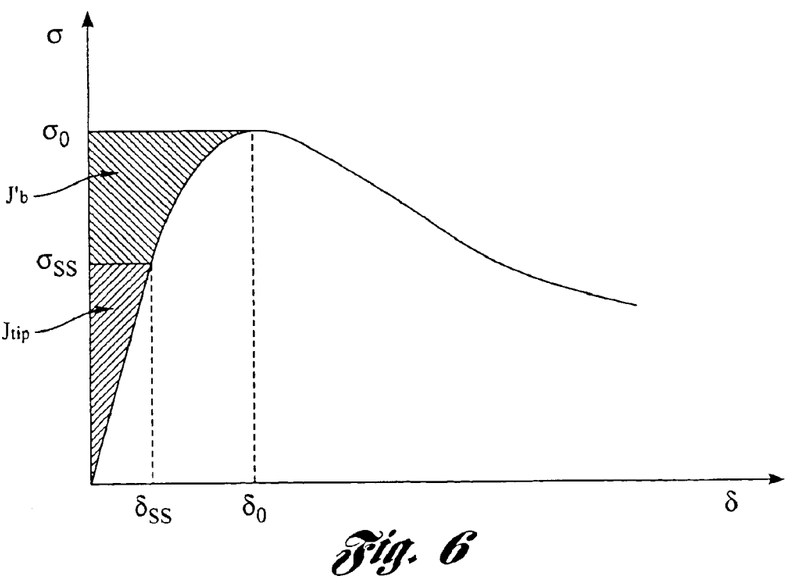
FIG. 6 illustrates schematically some of the relationships in a micromechanical model for brittle matrix composites.

Selection of particular fibers and fillers can be determined from micromechanical models which relate the mechanical interactions between fiber, brittle matrix, and interface phases to composite ductility. A fundamental requirement for a fiber-reinforced brittle matrix composite to strain hardens in tension is that steady state cracking occurs, wherein a crack increases in length at constant ambient tensile strength $\sigma_{ss}$ while maintaining a crack opening $\delta_{ss}$. D. Marshall and B. N. Cox, "A J-integral Method for Calculating Steady-State Matrix Cracking Stress in Composites," MECHANICS OF MATERIALS, V. 7, No. 8, August, 1988, pp. 127–133. This phenomenon prevails when the condition:

$$J'_{tip} = \sigma_{ss}\delta_{ss} - \int_0^{\delta_{ss}} \sigma(\delta)d\delta \qquad (1)$$

is satisfied. In Eqn. (1), J'$_{tip}$ approaches the matrix toughness $K_m^2/E_m$ at small fiber content, such as less than 3% by volume. $\sigma(\delta)$ is the generalized stress-crack opening relationship, which describes the inelastic deformation $\delta$ at a crack face when subject to ambient stress $\sigma$. FIG. 6 schematically illustrates Eqn. (1) on a $\sigma(\delta)$ plot. Since the maximum ambient stress is bounded by peak bridging stress $\sigma_0$, it reveals an upper limit on the matrix toughness for steady state crack propagation mode:

$$\frac{K_m^2}{E_m} \leq \sigma_o\delta_o - \int_0^{\delta_o} \sigma(\delta)d\delta \equiv J'_b \qquad (2)$$

where $\delta_0$ is the crack opening corresponding to $\sigma_0$.

In order to apply the steady state cracking condition in material design, the stress-crack opening relationship $\sigma(\delta)$ has to be correlated to micromechanics parameters of each material phase. For the case of discontinuous short fiber-reinforced cementitious composite, a comprehensive analytic $\sigma(\delta)$ model can be found in V. C. Li, "Post-Crack Scaling Relations for Fiber-Reinforced Cementitious Composites," ASCE J. OF MATERIALS IN CIVIL ENGINEERING, V. 4, No. 1, 1992, pp. 41–57; Z. Lin et al., "On Interface Property Characterization and Performance of Fiber Reinforced Cementitious Composites," J. CONCRETESCIENCE AND ENGINEERING, RILEM, Vol. 1, 1999, pp. 173–184. In this model, the fiber is characterized in terms of volume fraction $V_f$, fiber length $l_f$, diameter $d_f$, elastic modulus $E_f$ and tensile strength of $\sigma_{fu}$. The matrix is characterized in terms of its fracture toughness $K_m$, elastic modulus $E_m$ and initial flaw size distribution $a_0$. The fiber and matrix interaction, or interface characteristics, are described by the interfacial frictional stress $\tau_o$, chemical bond $G_d$ and slip-hardening coefficient $\beta$. Specifically, the energetics of crack propagation along fiber/matrix interface is used to quantify the debonding process and the bridging force of a fiber with given embedment length; statistics is introduced to describe the random nature of preexisting flaws and the random location and orientation of fibers.

Parameter studies based on the foregoing models produces a set of targeted micromechanics properties, which provide guidance to the selection of mixture constituents for achieving strain-hardening behavior. Assuming an upper bound of J'$_{tip}$ of 1 J/m$^2$ for a matrix with lightweight filler, which is about half of that of normal cement paste, and a targeted composite tensile strength of at least 2.5 MPa, the following ranges of fiber and interfacial properties are preferred: fiber strength at least 800 MPa, fiber diameter from 20 to 100 μm and more preferably from 30 to 60 μm, fiber modulus of elasticity from 10 to 300 GPa and more preferably from 40 to 200 GPa, and fiber length from 4 to 30 mm that is partially constrained by processing restriction; interface chemical bonding below 4.0 J/m² and more preferably below 2.5 J/m², interface frictional stress from 0.5 to 3.0 MPa and more preferably from 0.8 to 2.0 MPa, and interface slip hardening coefficient below 3.0 and more preferably below 1.5.

Having generally described this invention, a further understanding can be obtained by reference to certain specific examples which are provided herein for purposes of illustration only and are not intended to be limiting unless otherwise specified.

EXAMPLES 1–10

Exemplary mixes at various densities are prepared to illustrate the invention. The examples contain cement, water, lightweight fillers, sand, viscosity control agent, water reducing agent, and discontinuous short fiber. Mix proportions are tabulated in Table 1, and are in parts by weight with the exception of fiber which is in parts by volume. The cement used is Type I Portland Cement from Lafarge Cement Co., MI, USA. Two types of Scotchlite™ glass bubbles from 3M Co., Minnesota, USA, i.e. S38 and S60, and Micro-hollow-bubble MHK available from Heidelberger Bauchemie Co. Ltd., Leimen, Germany are used as lightweight fillers. Fine sand with a size distribution from 50 to 150 μm, available as F110 from US Silica Co., Berkeley Springs, W. Va., USA, is used in some mixes to improve the modulus of elasticity. The viscosity control agent used is hydroxypropyl methylcellulose ("MC"), available as Methocel™ cellulose ether through Dow Chemical Co., Midland, Mich., USA. The water reducing agent used is the superplasticizer available as Melment™ 330 from W.R. Grace & Co., IL, USA ("SP"). K-II REC™ PVA fiber available through Kuraray Co. Ltd of Osaka, Japan, is used in all exemplary mixes at 2% volume fraction.

The mixture is prepared in a Hobart mixer with a planetary rotating blade. The cement, sand, lightweight fillers and methylcellulose powder are dry mixed for approximately 1–2 minutes, and then water and superplasticizer is added and mixed another 2 minutes. Finally, the fibers are slowly added, until all fibers are dispersed into the cementitious matrix. The fresh mixture is cast into plexiglass molds, and moderate vibration applied. Specimens were demolded after 24 hours and then cured in water at room temperature for 28 days. The samples are dried in air and their physical properties measured.

A uniaxial tensile test is conducted to characterize the tensile behavior of the composite. Since some quasi-brittle fiber reinforced cement composites show apparent strain-hardening behavior under flexural loading, a direct uniaxial tensile test is considered the most convincing way to confirm strain-hardening behavior of the composite. The test coupon specimen measures 304.8 mm×76.2 mm×12.7 mm. Aluminum plates are adhesively bonded to the coupon specimen ends to facilitate gripping. Tests are conducted in an MTS machine with 25KN capacity under displacement control. The loading rate is 0.15 mm/min. throughout the test. Two external LVDTs (Linear Variable Displacement Transducer) are attached to specimen surface with a gage length of about 180 mm to measure the displacement. During the test, crack openings are measured with a MicroWatcher (Olympus, Japan) at 200× magnification.

Compression tests are conducted using cylindrical test specimens measuring 75 mm in diameter and 150 mm in height. The loading rate is 0.50 mm/min., and only the peak loads are recorded.

Figure 1:
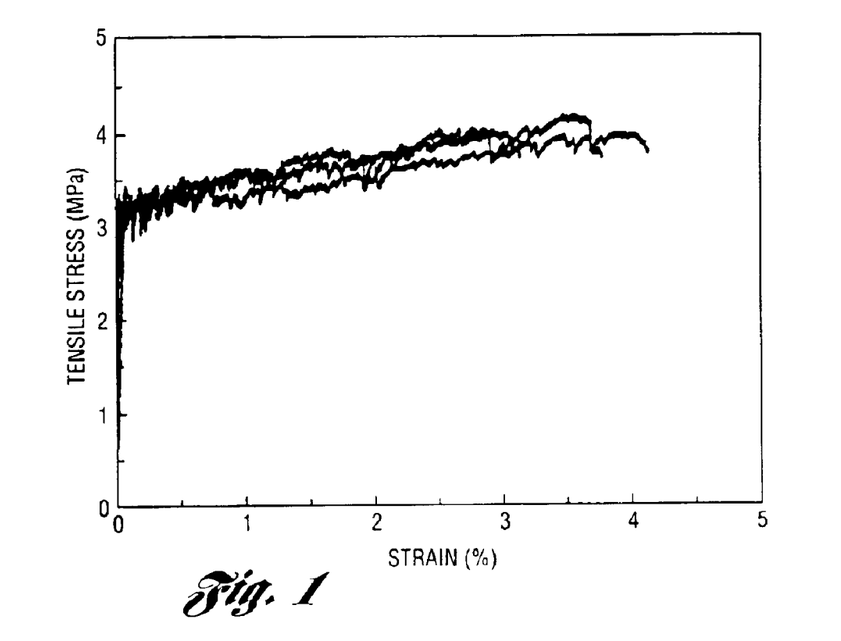
FIG. 1 illustrates a stress strain curve for one embodiment of a strain-hardening brittle matrix composite of the present invention.
Figure 2:
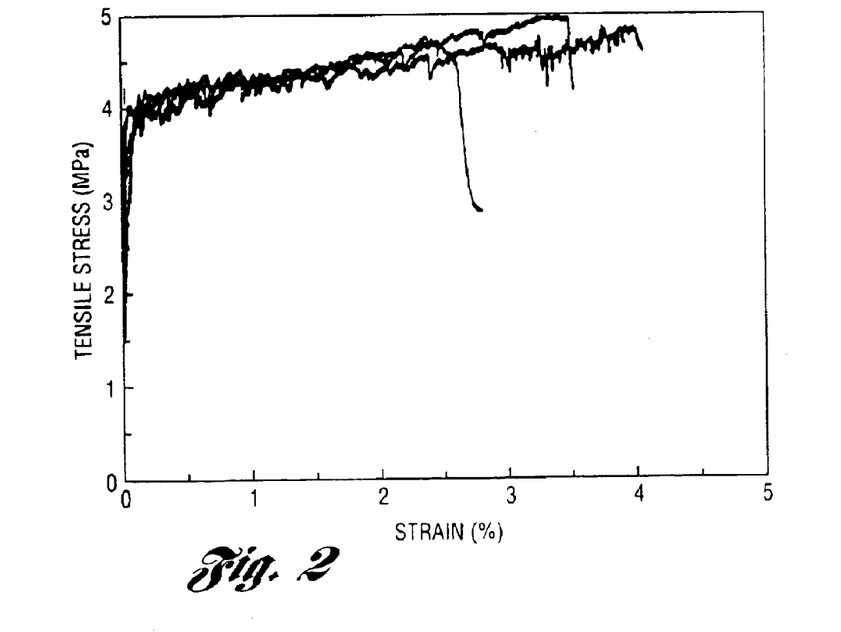
FIG. 2 illustrates a stress strain curve for a further embodiment of a strain-hardening brittle matrix composite of the present invention.

The test results are summarized in Table 2, including density, tensile strength and strain capacity, and compressive strength for each Example mix. Characteristic tensile stress versus strain curves of representative composites are illustrated in FIGS. 1 and 2. All the mixes exhibit significant strain-hardening behavior.

TABLE 1

| Mix No. | Cement | Water | Sand | Lightweight Filler | MC | SP | Fiber by Volume |
|---|---|---|---|---|---|---|---|
| 1 | 1 | 0.45 | 1.0 | S38, 0.05 | 0.0015 | 0.030 | 0.02 |
| 2 | 1 | 0.47 | 1.0 | S38, 0.10 | 0.0015 | 0.030 | 0.02 |
| 3 | 1 | 0.47 | 1.0 | S38, 0.20 | 0.0015 | 0.030 | 0.02 |
| 4 | 1 | 0.45 | 0.6 | S60, 0.40 | 0.0015 | 0.035 | 0.02 |
| 5 | 1 | 0.48 | 1.0 | S60, 0.20 | 0.0015 | 0.040 | 0.02 |
| 6 | 1 | 0.45 | 0 | S60, 0.20 | 0.0015 | 0.030 | 0.02 |
| 7 | 1 | 0.60 | 0 | S60, 0.50 | 0.0015 | 0.040 | 0.02 |
| 8 | 1 | 0.75 | 0 | S38, 0.50 | 0.0015 | 0.040 | 0.02 |
| 9 | 1 | 0.45 | 1.0 | Air bubble, 0.26 by volume | 0.0010 | 0.020 | 0.02 |
| 10 | 1 | 0.45 | 1.0 | MHK, 0.05 | 0.0010 | 0.030 | 0.02 |

TABLE 2

| Mix. No. | Density (g/cm³) | Tensile first cracking strength (MPa) | Tensile ultimate strength (MPa) | Tensile strain capacity (%) | Compressive Strength (MPa) |
|---|---|---|---|---|---|
| 1 | 1.78 | 3.28 | 4.25 | 3.68 | 46.4 |
| 2 | 1.61 | 3.20 | 3.94 | 3.62 | 42.3 |
| 3 | 1.46 | 3.12 | 4.02 | 3.71 | 39.2 |
| 4 | 1.42 | 2.95 | 3.80 | 3.71 | 36.7 |
| 5 | 1.67 | 3.90 | 4.56 | 3.42 | 43.2 |
| 6 | 1.45 | 2.74 | 4.31 | 4.24 | 41.7 |
| 7 | 1.10 | 2.18 | 3.17 | 3.41 | 26.2 |
| 8 | 0.93 | 2.01 | 2.85 | 3.70 | 21.8 |
| 9 | 1.48 | 2.54 | 2.78 | 2.85 | 22.4 |
| 10 | 1.78 | 3.16 | 3.65 | 1.96 | 38.4 |

Mixes 1, 2 and 3 have same weight ratio of sand to cement but different content of glass bubble S38 for achieving different density. The test results show that even though the density is reduced to 1.46 g/cm³ with the increase of S38 content, the tensile first cracking strength, ultimate strength, and strain capacity is little changed. The average tensile strain capacity reaches about 3.6%, compared with 0.01% for unreinforced cement mortar and below 0.5% for fiber reinforced, dense cement. The compressive strength decreases with the density; however, at a density of 1.46 g/cm³ the strength 39.2 MPa is still higher than most normal strength concrete which typically has a density of around 2.40 g/cm³ (2400 kg/m³).

Mixes 4 and 5 also contain sand but use glass bubble S60 instead of S38, which has smaller particle size. Mixes 2 and 5 show similar density, suggesting that the volume fraction of voids is similar in these two composites though the size distribution of voids is different. Composite made from Mix 5 has finer void system than the composite made from Mix 2. A comparison between FIG. 1 and FIG. 2 indicates that smaller void size can lead to higher tensile strength.

Mixes 6, 7 and 8 are a set of composites targeting very low density. Test results show that the further increase of glass bubble content has little influence on composite strain capacity but significantly reduces the strength both in tension and compression. However, even at a density lighter than water. i.e. Mix 8, the tensile strength 2.85 MPa and compressive strength 21.8 MPa satisfy requirements of many structural applications.

Mix 9 is an embodiment using air bubble as lightweight filler. The air bubbles in Mix 9 are produced by an air entrainment agent available as Addiment™ LPS A94 through Heidelberger Bauchemie Co. Ltd., Leimen, Germany. As stated above, one difficulty in practicing the invention by using air bubbles or foam is that the bubble size is not stable during the mixing and handling process. Mechanical force and time both will change the size distribution of air bubbles and form large voids. As a result, the compressive strength of Mix 9 is significantly lower than that of Mix 3, which has a similar density.

Mix 10 is an embodiment using a polymeric bubble as the lightweight filler. The micro-hollow-bubble MHK used here has the desired size distribution. However, since this polymeric bubble has a weaker bond to cement hydrates and PVA fiber than glass bubbles, the tensile strain capacity of Mix 10 is lower than Mix 1, which has similar density, but nevertheless still reaches nearly 2%.

Figure 3:
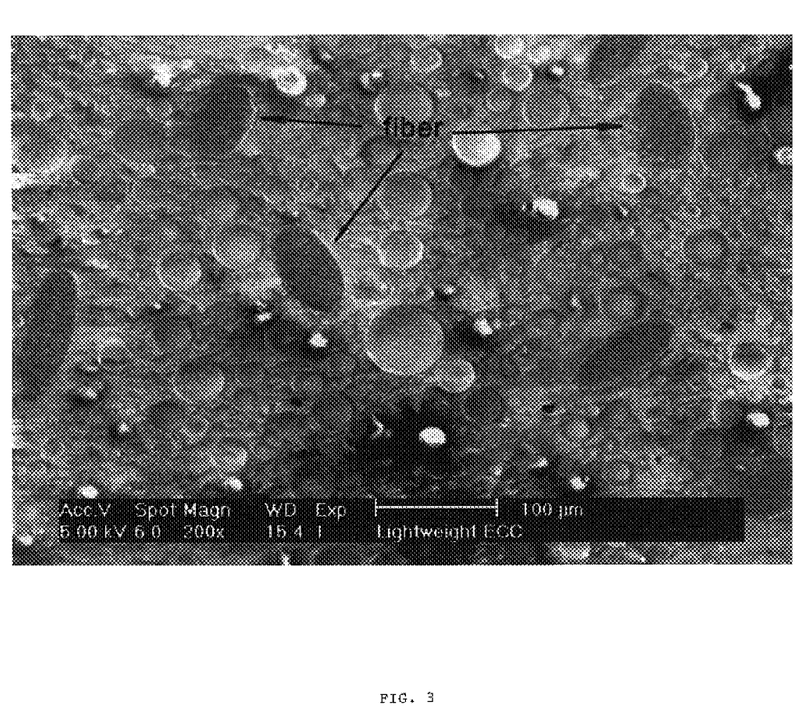
FIG. 3 is an SEM of a cross-section of a strain-hardening brittle matrix composite of the present invention.
Figure 4:
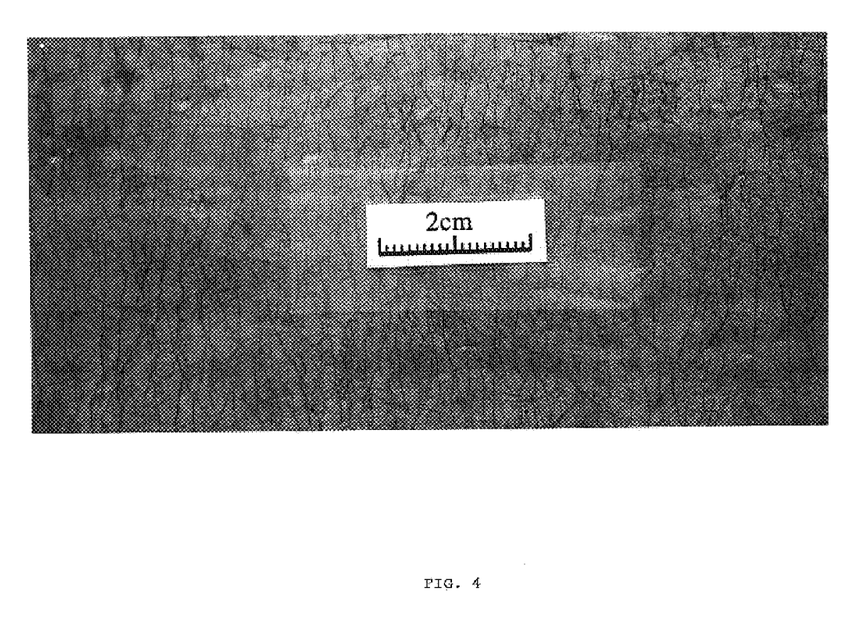
FIG. 4 illustrates the saturated crack pattern of the composite of FIG. 3.
Figure 5:
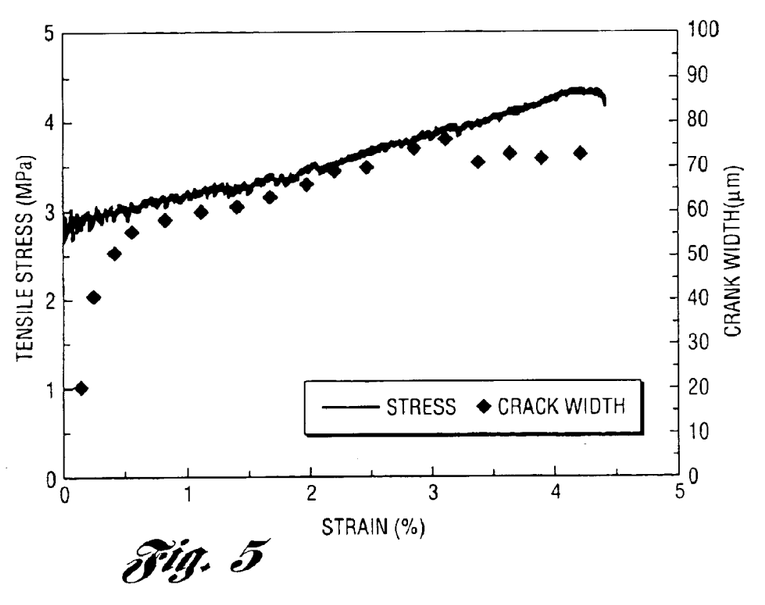
FIG. 5 illustrates the crack width versus strain relationship of the composite of FIG. 3.

FIG. 3 shows a cross-sectional SEM image of Mix 6, wherein a finer cellular structure was formed due to the smaller size of the glass bubble S60, along with randomly distributed PVA reinforcing fiber. FIG. 4 shows the saturated crack pattern of Mix 6, wherein the crack spacing is less than 2 mm. FIG. 5 shows the crack opening development with the increase of strain of Mix 6. Shortly after first cracking, the crack width grows rapidly and then stabilizes at about 80 $\mu$m as additional microcracks are developed, while for typical FRC the crack width almost increase linearly with the deformation of the composite while the load drops.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A hydraulically settable lightweight concrete composition which cures to a cured composite following addition of water and exhibits strain hardening behavior following cure, said composition comprising
   a) a brittle inorganic matrix precursor;
   b) matrix interactive reinforcing fibers having a minimum average length of about 4 mm, present in an amount of from 0.5 volume percent to less than 4 volume percent based on the total volume of cured composite;
   c) at least one lightweight aggregate having a mean particle size in the range of 10 $\mu$m to 1000 $\mu$m, in an amount effective to achieve a target density in said cured composite not more than 2000 kg/m$^3$.

2. The composition of claim 1, wherein said reinforcing fibers comprise polymeric reinforcing fibers having a mean diameter from 10 to 60 $\mu$m, a mean length of 4 mm to 30 mm, a strength of 800 MPa or higher, a modulus of elasticity of 10 to 300 GPa, interfacial chemical bonding below 4.0 J/m$^2$, interface frictional stress from 0.5 to 3.0 MPa, and an interface slip hardening coefficient below 3.0.

3. The composition of claim 1, wherein said lightweight aggregate comprises microballoons having a mean diameter of from 10 $\mu$m to 100 $\mu$m.

4. The composition of claim 3, wherein said microballoons have walls of glass, ceramic, or polymer.

5. The composition of claim 1, wherein said brittle inorganic matrix precursor comprises a hydraulically settable cement or an inorganic polymer.

6. The composition of claim 1, wherein said brittle inorganic matrix precursor comprises a Portand cement.

7. The composition of claim 1, comprising from 1.0 to 3.0 volume percent reinforcing organic fibers based upon the volume of the cured composite, and sufficient lightweight aggregate to achieve a density, when cured by addition of water, of from 800 kg/m$^3$ to 1900 kg/m$^3$.

8. The composition of claim 1, wherein said reinforcing fibers are selected from the group consisting of high density polyethylene fibers, polyvinyl alcohol fibers, and polyacrylamide fibers.

9. The composition of claim 1, wherein said fibers contain polar or hydrophilic groups.

10. The composition of claim 1, wherein at least a portion of said lightweight aggregate comprises gas filled voids.

11. The composition of claim 1, wherein gas filled voids are present, and a cured composite achieved by adding water and curing, has a density of from 1500 kg/m$^3$ to 1900 kg/m$^3$.

12. A fiber reinforced lightweight concrete structure, comprising a cured, fiber reinforced brittle matrix composite prepared by adding water to the composition of claim 1 to form a hydraulically curable composition, and allowing said curable composition to cure.

13. The composite composition of claim 9 which when cured to a composite has a density in the range of 800 to 2000 kg/m$^3$ and exhibits a tensile strain of 2% or greater.

14. The composite composition of claim 9 which when cured to a composite has a density in the range of 900 kg/m$^3$ to 1600 kg/m$^3$ and a tensile strain capacity greater than 3.0%.

15. The composition of claim 1, wherein said matrix interactive fibers are present in an amount of from 1.5 to 2.5 volume percent based on the volume of the cured composite.

16. The composition of claim 15, wherein said lightweight aggregate has a mean particle size in the range of 10 $\mu$m to 100 $\mu$m.

17. The composition of claim 1, further comprising non-matrix interactive fibers.

18. The composition of claim 1, wherein a non-matrix interactive fiber is selected from the group consisting of carbon fibers, polypropylene fibers, cellulose fibers, low density polyethylene fibers, and steel fibers.

19. The composition of claim 1, wherein said matrix interactive fibers have a mean diameter of from 30 $\mu$m to 60 $\mu$m.

* * * * *

UNITED STATES PATENT AND TRADEMARK OFFICE
CERTIFICATE OF CORRECTION

PATENT NO. : 6,969,423 B2
DATED : November 29, 2005
INVENTOR(S) : Victor C. Li et al.

It is certified that error appears in the above-identified patent and that said Letters Patent is hereby corrected as shown below:

<u>Column 10,</u>
Lines 35 and 38, delete "composite".

Signed and Sealed this

Twenty-eighth Day of March, 2006

JON W. DUDAS
*Director of the United States Patent and Trademark Office*